United States Patent
Adelmann (10) Patent No.: US 9,576,316 B2
(45) Date of Patent: Feb. 21, 2017

(54) DYNAMIC MENUS

(71) Applicant: Todd Christopher Adelmann, Fort Collins, CO (US)

(72) Inventor: Todd Christopher Adelmann, Fort Collins, CO (US)

( * ) Notice: Subject to any disclaimer, the term of this patent is extended or adjusted under 35 U.S.C. 154(b) by 107 days.

(21) Appl. No.: 13/763,667

(22) Filed: Feb. 9, 2013

(65) Prior Publication Data

US 2014/0229302 A1  Aug. 14, 2014

(51) Int. Cl.
*G06Q 20/00* (2012.01)
*G06Q 30/06* (2012.01)
*G06Q 50/12* (2012.01)

(52) U.S. Cl.
CPC .......... *G06Q 30/0641* (2013.01); *G06Q 50/12* (2013.01)

(58) Field of Classification Search
CPC ..... G06Q 10/06; G06Q 30/00; G06Q 30/0633
USPC ............................................ 705/15, 16, 7.15
See application file for complete search history.

(56) References Cited

U.S. PATENT DOCUMENTS

| | | | | |
|---|---|---|---|---|
| 5,839,115 A | * | 11/1998 | Coleman | G06Q 10/087 705/15 |
| 6,003,015 A | * | 12/1999 | Kang | G06Q 10/087 312/100 |
| 2003/0163321 A1 | * | 8/2003 | Mault | A61B 5/044 704/270 |
| 2007/0273611 A1 | * | 11/2007 | Torch | A61B 3/0066 345/8 |
| 2011/0175932 A1 | * | 7/2011 | Yu | G06F 3/048 345/661 |
| 2011/0258011 A1 | * | 10/2011 | Burns et al. | 705/7.15 |

* cited by examiner

*Primary Examiner* — Rokib Masud (57) ABSTRACT

Methods, systems, and computer-readable mediums for a data entry system are provided. A method of operating a data system in accordance with the invention includes a computer processor configured for receiving a viewing direction of a first party, where the first party is looking in the viewing direction to view a menu of information. The method further includes identifying a portion of the menu based on the viewing direction of the first party and displaying, to a second party, one or more menu choices associated with the identified portion of the menu. The method may also include receiving, from the second party, a selection of one of the one or more menu choices where the selection of the one menu choice by the second party is based, at least in part, on supplemental information received by the second party from the first party.

21 Claims, 5 Drawing Sheets

DYNAMIC MENUS

TECHNICAL FIELD

This application is related to the field of data entry. More specifically, this application is related to displaying menu choices based on a viewing direction.

BACKGROUND

The advancement of computer and display technologies has increased the amount of information people interact with. Even though the computer and display systems add some automation to data entry processes, there is often still human involvement. In some cases, the data entry involves interactions between two or more humans. For example, a customer of a business may communicate with an employee of a business regarding a request or an order. The employee of the business often enters the customer's request into an electronic terminal of some type. Often the customer may be selecting from among many different offerings of the business, including many options, and/or sub-options of products or offerings of the business. The employee is typically using an order entry screen that may contain a large amount of information associated with all the available options.

In some cases, an order entry screen may include trees or tiers of menus which allow the employee to narrow down to the specific product the customer is requesting and/or options associated with that product. Businesses often attempt to offer more products and more variations of their products to be more competitive, to offer appealing alternatives to a wider range of customers, or for marketing reasons. In some cases, it can be difficult to quickly find the information on the display that the customer is asking about and/or requesting. In one specific example, a fast food restaurant may have a relatively large menu of food options. When a customer begins to order items, it may be difficult for the employee to quickly find the requested item(s) on the order entry screen from among all the different available options.

The challenges described above may be compounded by additional factors including: a complex menu with many items, a menu with similar sounding items, a menu with multiple items which use some of the same words, language or accent differences between the customer and the employee, a noisy background environment, communication between the customer and the employee occurs over a communication medium that makes the communication more difficult, high density displays that include a large amount of information on a single screen, employees who have little or no familiarity with the order entry screen, reconfiguration of order entry screens placing items in locations that are different than the locations employees have become used to, and/or multiple order entry screens.

SUMMARY

Methods, systems, and computer-readable mediums for a data entry system are provided. A method of operating a data system in accordance with the techniques introduced here includes a computer processor configured for receiving a viewing direction of a first party, where the first party is looking in the viewing direction to view a menu of information. The method further includes identifying a portion of the menu based on the viewing direction of the first party and displaying, to a second party, one or more menu choices associated with the identified portion of the menu. The method may also include receiving, from the second party, a selection of one of the one or more menu choices where the selection of the one menu choice by the second party is based, at least in part, on supplemental information received by the second party from the first party.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In order to resolve the difficulties described above, the techniques introduced here pertain to methods, systems, and a computer readable medium comprising instructions for data entry. Advantageously, the embodiments described herein solve the difficulties described above by displaying only a portion of the available menu options based on a viewing direction of a person placing a request, placing an order, or communicating some other type of selection. While many of the examples herein are described with respect to a person placing an order at an order counter of a restaurant, the present invention is not to be limited to this example or this field of endeavor. In fact, the invention is applicable to many different fields and can be applied for many different uses and benefits. The present invention is to be limited only be the description provided in the claims.

In a quick service restaurant environment, a customer may order at a counter or at a drive through window. The customer is typically viewing a menu of choices. The menu may have many different choices. In many cases, the menu may have many similar soundings items (i.e., the restaurant may offer many different types of "burgers"). An employee of the restaurant is typically entering the customer choices on a cash register, an order entry terminal, a touchscreen display, or a point of sale (POS) terminal. It can be challenging for the employee to find the exact item(s) the customer is requesting from among the many available options. An employee struggling to find the items quickly can reduce efficiency, generate customer frustration, reduce order accuracy, reduce employee job satisfaction, cause waiting customers to leave, and/or detract from the customer experience.

The challenge of finding and entering the customer's choices in the terminal quickly and accurately can be made more challenging if the menu is a complex menu with many items. It may be further difficult if the menu has many similar sounding items and/or if the menu has multiple items which use some of the same words. For example, the restaurant may have many different types of burritos and it may be hard to tell which one the customer is ordering or is asking about. These problems can be further exacerbated if the customer and the employee do not speak the same language or have different accents. These problems may be further exacerbated if the customer is making his or her requests in a noisy environment or through a drive-thru order communication system which has background noise or interference.

The situations described above are particularly challenging for new employees or employees who have little experience with a particular order entry panel or screen. After an employee works with a screen or panel for a period of time, the employee becomes more familiar with where various menu items/options are located. However, even experienced employees may also experience some of the same challenges when assigned to work in an area that uses new order entry screens or terminals. This may also occur when new items are added or when the arrangement of items on the order entry screens or terminals is reconfigured.

The present invention solves one or more of the problems described above by reducing the amount of information displayed on the display terminal based on a viewing direction of the customer. In many cases, the customer is viewing a large menu that is posted above the employee's head. The customer's viewing direction is received and only the portion of the menu items associated with the customer's viewing direction is displayed on the order entry terminal. In this way, the employee is presented with a smaller list or range of selections on the order entry terminal making it easier for the employee to find the item the customer is requesting or asking about.

Figure 1:
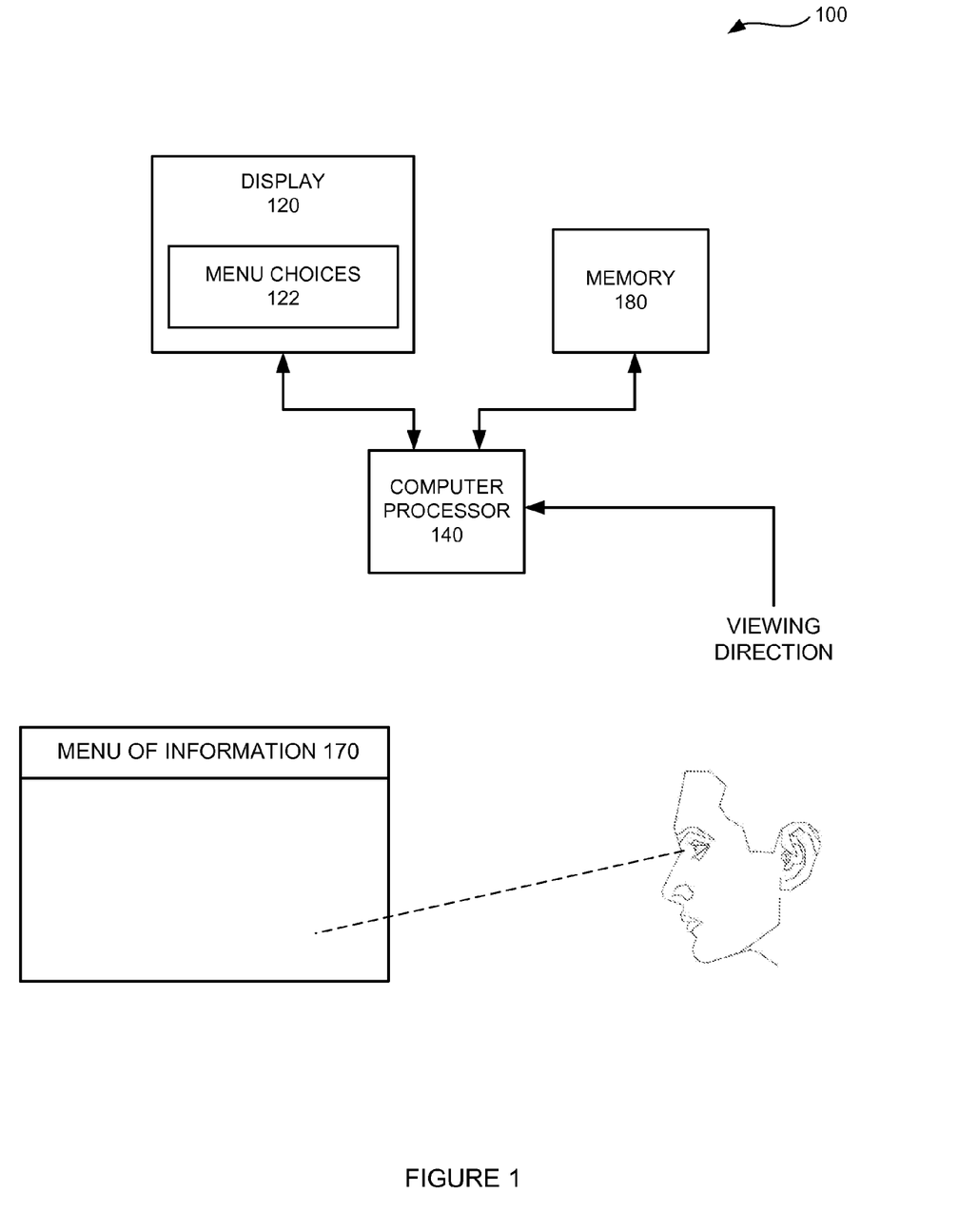
FIG. 1 illustrates an operating environment in which an embodiment of the techniques introduced here may be implemented.

Having discussed aspects of the invention generally, attention is now directed to FIG. 1 that illustrates operating environment 100 in which one or more embodiments may be implemented. Operating environment 100 includes computer processor 140, memory 180, display 120, and menu of information 170.

Computer processor 140 may be any type of computing device including a central processing unit (CPU), a computer, a laptop computer, a desktop computer, a server, a microprocessor, a tablet, a smartphone, programmable logic, application specific integrated circuit (ASIC), or computing device of another type. Computer processor 140 may be comprised of multiple computer processors, may be distributed across multiple systems or devices, and may include other circuitry or components.

Computer processor 140 runs machine executable instructions retrieved or loaded from memory 180. Memory 180 may comprise a hard drive, a CD drive, a DVD drive, a Blu-Ray drive, a memory card, a tape drive, random access memory (RAM), dynamic RAM (DRAM), flash memory, electrically programmable read only memory (EPROM), erasable EPROM (EEPROM), micro electro mechanical (MEMS) storage devices, or a combination thereof. Memory 180 may be collocated with computer processor 140 or may be in a remote location. Memory 180 may be access by computer processor 140 via a bus, a network, a wireless connection, or a combination thereof.

Computer processor 140 displays information on display 120. Display 120 may be a liquid crystal display, a cathode ray tube (CRT), a field emission display (FED), a vacuum fluorescent display (VFD), a plasma display, a flat panel display, an E-ink display, or other type of electronic information display device. Display 120 may also include a touchscreen or other type of data input mechanism. Any combination of computer processor 140, memory 180, and display 120 may be integrated in a single device or distributed across multiple devices.

Menu of information 170 includes a list of menu items, selections, choices, or another set of information viewed by a person. The information of menu of information 170 may be grouped in many different ways. Menu of information 170 may include text, pictures, numbers, icons, and/or other representations of information. Computer processor 140 receives information describing a viewing direction of the person. Based on the viewing direction computer processor 140 then directs display 120 to display menu choices 122 based on the received viewing direction. Computer processor 140 communicates with display 120 using control signals, a bus, or other types of instructions sent from computer processor 140 to display 120. Advantageously, menu choices 122 comprises a subset of all the information included on menu of information 170 where the subset is defined or determined based on the viewing direction. The information displayed on display 120 may be in a format that is different than how it is presented on menu of information 170. For example, menu choices 122 may include shortened versions of the information from menu of information 170, abbreviations, codes, numbers, pictures, icons, or other variations.

Figure 2:
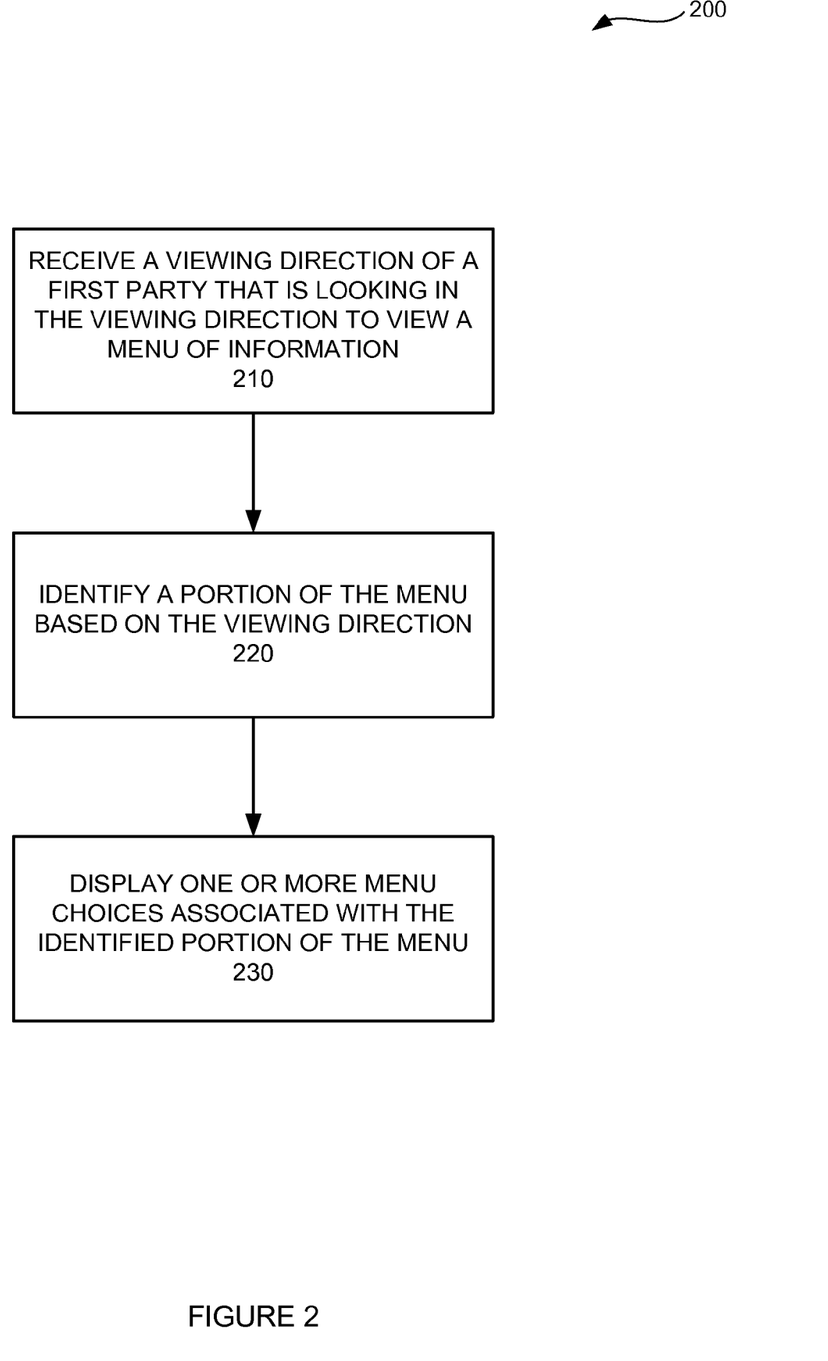
FIG. 2 illustrates a method of operating a data entry system.

FIG. 2 illustrates method 200 in one embodiment of the invention. Method 200 includes receiving a viewing direction of a first party, wherein the first party is looking in the viewing direction to view a menu of information (step 210). Method 200 also includes identifying a portion of the menu based on the viewing direction of the first party. Finally, method 200 includes displaying one or more menu choices associated with the identified portion of the menu.

Many of the examples described herein include receiving and/or determining a viewing direction of a person. One way a person's viewing direction may be determined is through eye tracking. Eye tracking is the process of measuring either the point of gaze or the motion of the person's eye relative to their head. An eye tracker is a device for measuring eye positions and eye movement. There are a number of methods for measuring eye viewing direction and eye movement. One common approach uses video images from which the eye position is extracted. This is a non-contact, optical method for measuring eye motion. Light, typically infrared, is reflected from the eye and sensed by a video camera or some other specially designed optical sensor. The information is analyzed to extract eye rotation from changes in reflections. Video based eye trackers typically use the corneal reflection and the center of the pupil as features to track. Optical methods, particularly those based on video recording, are widely used for gaze tracking and are sometimes favored for being non-invasive and inexpensive.

A more sensitive type of eye tracker, the dual-Purkinje eye tracker, uses reflections from the front of the cornea and the back of the lens as features to track. A still more sensitive method of tracking is to image features from inside the eye, such as the retinal blood vessels, and follow these features as the eye rotates. Other methods of determining a viewing direction make use of search coils or are based on an electrooculogram.

Figure 3:
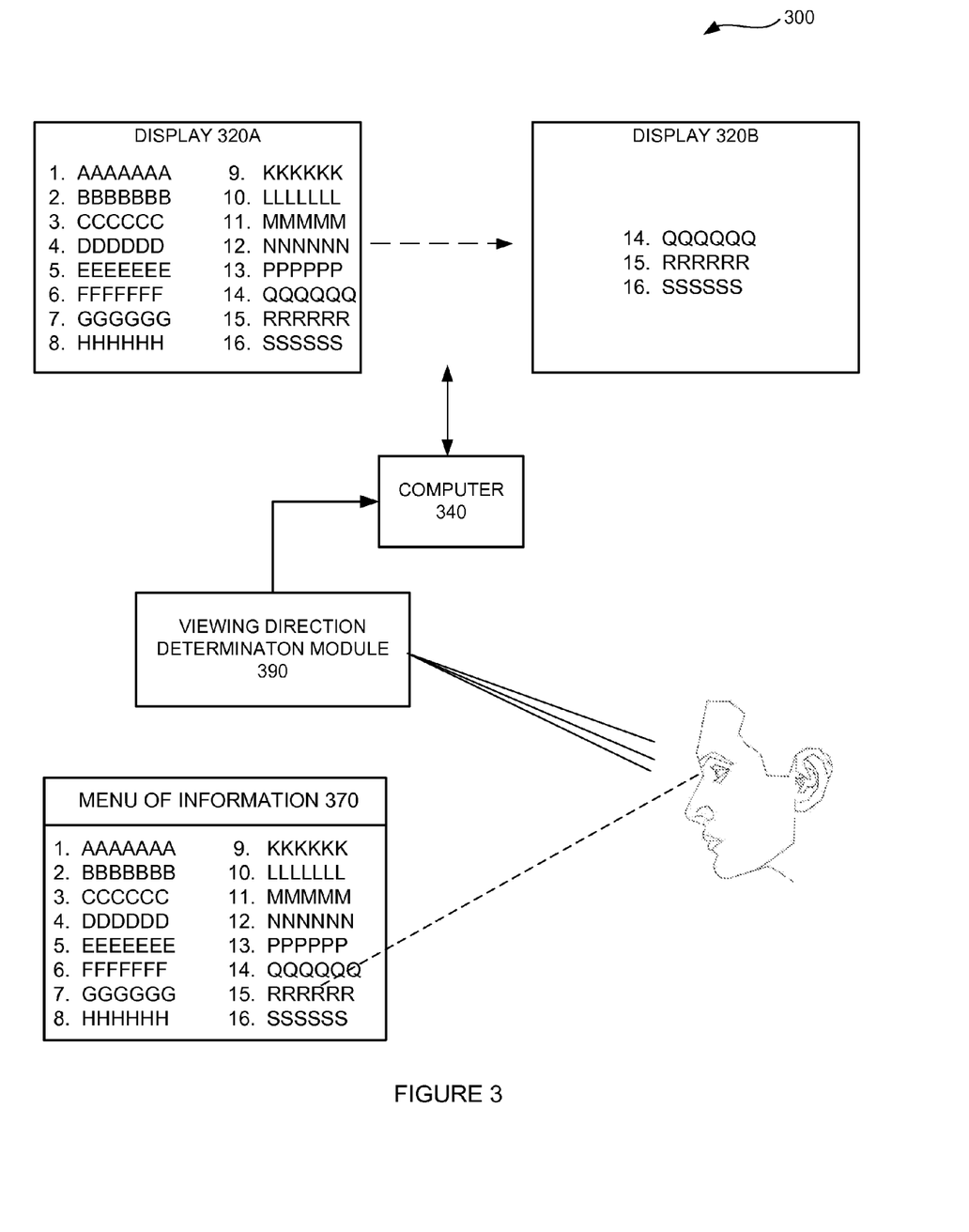
FIG. 3 illustrates another operating environment in which the techniques introduced here may be implemented.

FIG. 3 illustrates operating environment 300 in which one or more embodiments of the invention may be implemented. Operating environment 300 includes display 320A, display 320B, computer processor 340, viewing direction determination module 390, and menu of information 370.

Menu of information 370 is an example of menu of information 170 although other configurations are possible. Menu of information 370 contains lists of information or menu choices that a person may select from. In the example of FIG. 3, the menu contains two columns of menu choices with eight items in each column. Many other arrangements are possible and the invention is not to be limited to any particular menu configuration or layout of menu choices. In one example, the menu of information is a menu at a fast food restaurant and the customer views the menu to decide which items to order. The customer may be viewing menu of information 370 at an order counter inside a restaurant or at a drive thru order location that does not have a line-of-sight relationship with the order entry terminal.

Menu of information 370 may contain multiple items with similar or related names. For example, menu of information 370 may contain 5 different types of hamburgers. A customer may not typically recite the item name exactly or may recite the item name inaccurately. For these reasons, it is sometimes challenging for an employee to understand exactly which item the customer is asking for. Even in cases where item numbers are used, it may be difficult to understand what item the customer is asking for due to language barriers. For competitive reasons, restaurants and other business often desire to offer the widest variety of menu items possible in order to satisfy the largest number of customers. These menu items may change frequently making it even more difficult for the customer and the employee to understand exactly which items is being requested or ordered.

The employee of the business will typically be entering the requested items into a POS terminal, electronic cash register, or other computerized order entry interface. Many systems do not have dedicated physical keys for each item and really on an electronic display of the menu choices such as display 320A. Display 320 is an example of display 120 although other implementations and configurations are possible. In many cases, display 320A is a touchscreen which displays the available menu choices and allows the employee to select or enter the item(s) requested by the customer. In other cases, a keyboard or other input device, such as a mouse or pointer, may be used in conjunction with the display to make order entries. In the illustration of FIG. 3, the menu items are displayed on display 320A in the same configuration as menu of information 370. However, this is not required and the menu choices may be displayed in a variety of different layouts, formats, or configurations, including a hierarchical arrangement including submenus. The information displayed on display 320A is controlled by computer processor 340 or may be controlled by one or more other computer processors.

When the customer indicates a menu item they would like, the employee typically selects that item from display 320A. It should be understood that the many more menu items, on menu of information 370 and display 320A, are possible and only 16 items are shown for purposes of illustration.

Without the aid of the present invention, the employee must attempt to select the item the customer is requesting from the entire list of menu items on display 320A. As described previously, this may be difficult because the list of menu items is very long, because the menu contains multiple items with similar names, because the customer does not recited the name of the menu item exactly, because there are communication challenges, for other reasons, or for combinations of these reasons.

Menus of information are used in many other locations such as transportation ticket purchase counters and movie theaters. The invention is not to be limited to restaurant or food order entry applications.

Viewing direction module 390 is any type of device to determine a direction in which the customer is looking when making a selection. As described previously, many methods are known for determining a viewing direction of person. It should be understood that the invention is not to be limited to any particular method of determining a person's viewing direction. Viewing direction determination module 390 implements any of these methods, or combinations thereof, for determining a viewing direction of one or more customers looking at menu of information 370. Viewing direction determination module 390 may be located near menu of information 370 or integrated within menu of information 390 in order to improve its ability to detect the viewing or gaze direction of the customer. Viewing direction determination module 390 may be a single device or its functions may be distributed across multiple devices, including computer 340.

Computer 340 is an example of computer processor 140 although other configurations and operations are possible. Computer 340 interfaces with viewing direction determination module 390 to capture information conveying or describing the viewing direction of the ordering customer. Based on the indicated viewing direction, computer 340 directs display 320A to display a reduced number of menu items. Display 320B illustrates this result. Display 320B is not a separate physical display but is a separate representation of the information displayed on display 320 at a different point in time once the claimed method is performed. Without any viewing direction input, the display displays all of the menu choices, as illustrated in display 320A. Once the viewing direction is received, a more limited set of menu choices is displayed based on the viewing direction, as illustrated in display 320B.

In the example of FIG. 3, all of the menu items are initially displayed when an employee begins taking a customer's order as illustrated in display 320A. However, as the customer visually scans menu of information 370, viewing direction determination module 390 identifies and tracks the direction the customer is looking when he or she pauses to order an item. In this example, the customer is looking at the lower right corner of the menu. Viewing direction determination module 390 identifies the customer's viewing direction and makes this information available to computer 340. Computer 340 then directs the display to display only the menu items in this portion of the menu, as illustrated in display 320B.

In this example, the full list of menu items in display 320A is reduced to just the three items of display 320B in order to make it easier for an employee to determine which of the menu items the customer may be ordering or asking about. For example, items 2, 4, 5, 11, and 15 may have similar sounding names. Without the benefit of this invention, the employee may have to struggle to determine which of those items a customer is describing and/or may get the order wrong due to the similarity. Once computer 340 reduces the number of menu items based on the information received from viewing direction determination module 390, some or all of the potential order entry mistakes are avoided. The employee may need supplemental information from the customer, such as audio information obtained through a conversation with the customer, to make a final determination regarding which menu choice is being requested or asked about.

In this example, the potential confusion between items 2, 4, 5, 11, and 15 is avoided because the number of menu items displayed it reduced to a significantly smaller number and the employee knows the customer is likely not trying to order item 2, 4, 5, or 11 at the moment even though they may sound similar, or otherwise be related to item 15. The employee may make the selection based on information the customer is stating to the employee. The customer may be located across an order counter from the employee or may be at a drive thru location and communicating with the employee through an intercom system. The system may be configurable to change the number of items displayed on display 320B. In some cases the employee may have the option to toggle back and forth between display 320A and 320B to see the full list of menu items.

In an alternate embodiment, display 320B includes all of the original menu items from display 320B but highlights or otherwise emphasizes items 14, 15, and 16 in order to let the employee know that these are the menu items the customer is most likely referring to. This approach may be preferred in order to keep the display more consistent for the employee, to allow the employee to see the full list of choices even though a smaller list of the most likely candidates has been identified.

Once the employee selects an items for order entry, the display may revert to the full list of menu items or may immediately switch to a next subset of the menu items based on the customer changed viewing direction.

In one embodiment, viewing direction determination module 390 may be able to identify the customer's viewing direction accurately enough to narrow down the customer's viewing direction to a single item. In this case, the employee may only initially see that single item on display 320B and verify the desired item by speaking to the customer. In another variation, this system may be fully automated and may not require an employee to be actively involved. Computer 340 may make a tentative determination of the desired item based on the viewing direction and may confirm that item by communicating with the customer through an automated computerized voice, through a dynamic display seen by the customer, or through other means. This fully automated system may operate similarly to other interactive voice response (IVR) systems but with the added benefit of using the customer's viewing direction to assist the IVR system in determining which item the customer is requesting and/or increasing accuracy.

In other situations, the methods, systems, and software disclosed herein may be used to perform processes involving only a single party. Inputs to a software program or selections from among menus in the software program may be performed or assisted by detecting a user's viewing direction. In one example, a method of this type may include receiving, at a computer processor, a viewing direction of a user of a computer system or data entry system. The user is looking in the viewing direction to view a display of information on a display of the computer system or data entry system. The method further includes identifying, by the computer processor, one or more menu choices based on the viewing direction of the user. Finally, the method includes displaying the one or more identified menu choices. In this way, a computer system and/or software running on the computer system may display particular menu choices or options to a user based on the portion of the display the user is looking at. This makes use of the computer system and/or software easier for the user because a small number of menu choices or options are displayed to the user at any one time. In some cases, the software may be a web browser that the user uses to access a system or service through a network such as the Internet.

Using the approach described above, It is easier for the user to select from among the menu choices or options because there are fewer displayed and because the menu choices or options displayed are those that are most pertinent, or most likely pertinent, to what the user may wish to do based on the viewing direction. In one example, the user uses a web browser to interface to a banking system and manage personal financial accounts. Different portions of the screen may be associated with a checking account, a credit card, and one or more loans of the user. Different menu choices may exist for the different accounts. For example, menu choices associated the mortgage account may include a menu item to schedule a mortgage payment, while menu choices associated with the credit card account may include a menu item to see recent transactions. When all of the menu choices or options for all of the accounts are displayed at the same time, the number of menu items may be confusing or difficult to navigate for the user. However, use is simplified if only the menu choices for the checking account are displayed when the user is viewing the area of the screen associated with the checking account. In this way, the displayed or available menu options or choices are dynamically updated based on the user's viewing direction.

Figure 4:
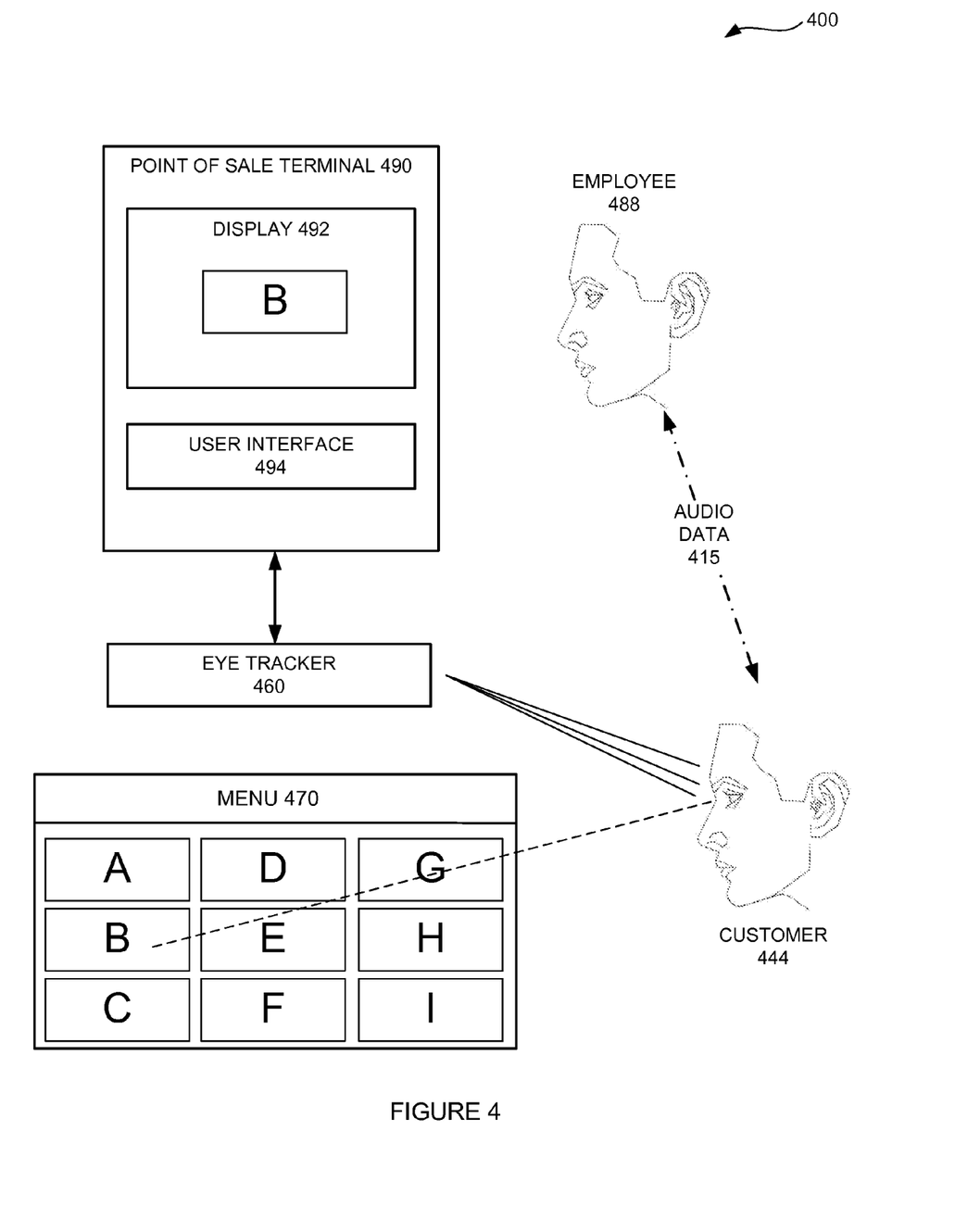
FIG. 4 illustrates operation of a data entry system.

FIG. 4 illustrates operating environment 400 in which another embodiment of the invention may be implemented. Operating environment 400 includes POS terminal 490, eye tracker 460, menu 470, employee 488, and customer 444. Audio data 415 is communicated between customer 444 and employee 488.

POS 490 includes display 492 and user interface 494 used by employee 490. User interface 494 is any device that enables employee 488 to provide input to POS 490. In some cases, user interface 494 may be a separate device such as a mouse, barcode scanner, or keypad. User interface 494 may also be integrated into display 492, such as in a touchscreen.

Eye tracker 460 is any type of device for determining a viewing or gaze direction of customer 444. In some cases, eye tracker 460 may be a standalone device. In other cases, may be integrated with menu 470 such that it has approximately the same spatial orientation to customer 444 as does menu 470. In other cases, when customer 444 places orders at or near POS 490, eye tracker 460 may be integrated with POS 490. In any of these cases, eye tracker 460 or POS 490 may be configured to take a difference of location between eye tracker 460 and menu 470 into account in determining or calculating the viewing direction of customer 444.

Menu 470 includes various areas or regions labeled "A" through "I." Each of these areas or regions may be referred to as a portion of the menu. Each portion includes one or more menu items. Each portion of the menu may be associated with a related group of menu items that are located near each other. Alternately, each portion of the menu may be defined based on breaking down the menu into physical regions regardless of whether the menu items in each portion of the menu have a relationship to each other or not. There are many methods for how many portions menu 470 may be broken into and how those portions may be identified or arranged and the invention is not to be limited to any particular method.

In this example, eye tracker 460 determines a viewing direction of customer 444. In this example, the viewing direction of customer 444 is associated with portion B of menu 470. Eye tracker 460 may make the association between the viewing direction and portion B or the raw viewing direction information may be transmitted to POS 490 and this determination made at POS 490. Based on this information, only the menu items associated with portion B of menu 470 are displayed on display 492 for selection by employee 488. As customer 444 describes the menu choice from menu 470 of interest, employee 488 only has to determine which menu choice customer 444 is referring to from among the menu choices in portion B. Audio data 415 may be communicated between customer 444 and employee 488 through a face-to-face conversation, through a discussion over an intercom system, or through an interaction that occurs using assistance of some other electronic device including a telephone or a computer network.

In one example, menu 470 is a list of movies and showing times at a movie theater. Customer 444 is standing at a ticket booth looking at menu 470 and communicating with employee 488 to purchase movie tickets. Each of portions "A" through "I" is associated with a different movie and lists various showing times for that movie. Display 492 may initially display to employee 488 options for all of the movies. Once a determination is made that customer 444 is looking at movie "B," the display is automatically changed to show only movie B or menu choices associated with movie B. While customer 444 will commonly tell employee 488 what movie he is interested in. Employee 488 may have difficulty hearing or understanding customer 444 and can be more sure of the movie customer 444 is interested in through use of the viewing direction information. Alternately, display 492 may continue to display options for all of the movies but may highlight or otherwise visually distinguish the selection(s) associated with movie B from the other displayed option(s). In this way, employee 488 can still see all of the options but knows to focus his attention on movie B as this is the most likely menu item that customer 444 is interested in.

In another embodiment of the invention, menu 470 may be an electronic menu and eye tracker 460 may be integrated into menu 470. In this case, the combined device may include a computer processor that manages the information displayed on menu 470 and can internally determine the content of the portion of menu 470 that customer 444 is viewing. In this case, the specific menu information or portion of menu 470 that the customer is viewing is transmitted to POS 490. In one example, portion B of menu 470 includes the various chicken sandwiches offered by a restaurant. Because menu 470 is an electronic menu, menu 470 contains electronic information regarding these menu items. After determining that customer 444 is viewing this portion of menu 470, the list of chicken sandwiches is transmitted from menu 470 for display on display 492 of POS 490. In this way, the processing logic associated with determining what information should be displayed to employee 488 is shifted from POS 490 to menu 470 and/or eye tracker 460.

In another variation of the invention, supplemental information is received from the customer and processed by a computer processor or point of sale terminal to select a menu choice. In one example, this supplemental information is audio information received by the computer processor or point of sale terminal from the customer. The viewing direction information and/or eye tracker is used by the computer processor to narrow down the possible list of menu choices that the customer may be requesting to a smaller subset of choices. The audio information is then electronically processed using speech processing and/or speech recognition algorithms to determine which specific of smaller subset of menu choices the customer is requesting. In this way, a process similar to that illustrated in FIG. 4 may be completed but without the involvement of, or need for, employee 488. Eye tracking information is used to narrow the choices down to portion B of the menu and the audio processing is used to determine which item within portion B the customer is requesting. The speech processing and speech recognition processes may be performed by an IVR that, among other things, confirms any conclusion reach by the computer processor with respect to the customer's request and/or order.

Figure 5:
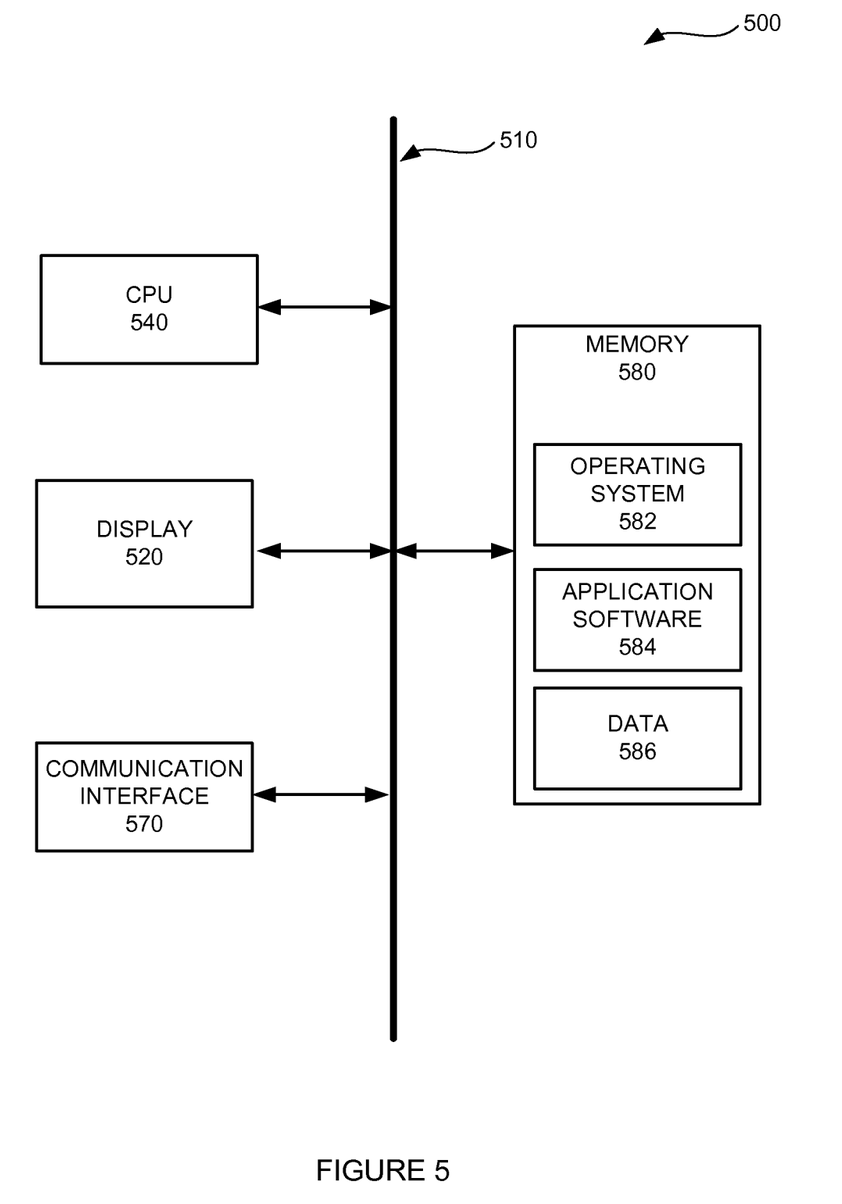
FIG. 5 illustrates a computing system which may be used to implement one or more of the techniques introduced here.

FIG. 5 is a block diagram of a computing system 500 that can be used to implement a data entry system. Computer 340 and point of sale terminal 490 are examples of computing system 500 although other configurations and operations are possible. In an illustrative embodiment, computing system 500 includes central processing unit (CPU) 540, display 520, communication interface 570, and memory 580. These elements communicate with each other using bus 510.

Memory 580 includes storage locations that are addressable by CPU 540 for storing software program code and data structures associated with the techniques introduced here. Memory 580 includes operating system 582, application software 584, and data 586. CPU 540 may include processing elements and/or logic circuitry configured to execute operating system 582 and application software 584 to perform the methods disclosed herein and to manipulate data 586. It will be apparent to those skilled in the art that other processing and memory implementations, including various non-transitory machine-readable storage media, may be used for storing and executing program instructions pertaining to the techniques introduced here. CPU 540 may communicate with other devices and systems using communication interface 570. In some cases, communication interface may enable CPU 540, or other components of the system to communication over a network, including the Internet.

Embodiments of the present invention include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the present invention may be provided as a computer program product which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, RAMs, erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," "in some cases," and the like generally mean the particular feature, structure, or characteristic following the phrase is included in at least one embodiment of the present invention and/or may be included in more than one embodiment of the present invention. In addition, such phrases do not necessarily refer to the same embodiments or different embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the claims.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method comprising:
   receiving, at a computer processor, a viewing direction of a first party, wherein the first party is looking in the viewing direction to view a menu of information that includes a plurality of menu items;
   identifying, by the computer processor, an area of the menu based on the viewing direction of the first party;
   identifying, by the computer processor, two or more menu choices that are a subset of the plurality of menu items, wherein the two or more identified menu choices are identified based on the identified area of the menu, wherein the two or more identified menu choices are located in the identified area of the menu, and wherein the two or more identified menu choices are in proximity to each other on the menu;
   displaying, on an electronic display device to a second party, the two or more identified menu choices of the identified area of the menu prior to the first party communicating a choice from among the plurality of menu items;
   receiving supplemental information from the first party;
   transmitting the supplemental information to the second party; and
   in response to displaying the two or more identified menu choices and in response to transmitting the supplemental information, receiving, from the second party, a menu item selection from among the two or more displayed menu choices.

2. The method of claim 1 wherein the supplemental information includes audio information.

3. The method of claim 1 wherein receiving the viewing direction of the first party comprises optically determining the viewing direction of the first party.

4. The method of claim 1 wherein the two or more menu choices in the identified area of the menu are identified by retrieving stored information indicating content of the identified area of the menu.

5. The method of claim 1 wherein:
   the first party is a customer of a business;
   the plurality of menu items are associated with items or services offered by the business; and
   the two or more menu choices are displayed to the second party on a point of sale terminal.

6. The method of claim 5 wherein the business is a food provider and the menu is displayed at a drive-thru order location of the food provider.

7. The data entry system of claim 6 wherein to present, on the display, the two or more menu choices from among the plurality of menu items, includes to present the plurality of menu items on the display and to present the two or more menu choices on the display in a highlighted format.

8. The data entry system of claim 6 wherein the instructions further direct the computer processor to alternately present, on the display, the two or more menu choices and the plurality of menu items in response to a toggle request from a user of the data entry system.

9. The method of claim 1 wherein displaying, on the electronic display device to the second party, the two or more identified menu choices of the identified area of the menu includes displaying the plurality of menu items and displaying the two or more identified menu choices in an emphasized format relative to a remainder of the displayed plurality of menu items.

10. A data entry system comprising:
    a display;
    a memory including computer processor executable instructions; and
    a computer processor configured to retrieve the instructions from the memory, wherein the instructions, when executed by the computer processor, direct the computer processor to:
      receive information regarding a viewing direction of a first party, wherein the first party is looking in the viewing direction to view a menu of information;
      identify an area of the menu associated with the received viewing direction of the first party;
      identify two or more menu choices from among a plurality of menu items that make up the menu of information, wherein the two or more menu choices are identified based on the viewing direction of the first party and based on the two or more menu choices being included in the identified area of the menu;
      present, on the display, the two or more menu choices of the identified area of the menu, wherein the two or more menu choices are presented on the display prior to receiving information from the first party other than the viewing direction; and
      identify a selected menu item from among the displayed two or more menu choices associated with the identified area of the menu, wherein the identification of the selected menu item is based, at least in part, on supplemental information.

11. The data entry system of claim 10 wherein the supplemental information is audio information received by the computer processor from the first party and the detected menu item is identified by performing speech recognition processing on the audio information to identify the selected menu item from among the two or more menu choices of the identified area of the menu.

12. The data entry system of claim 10 wherein:
the supplemental information includes a selection of the selected menu item received from a second party, wherein the two or more menu choices are displayed to the second party and wherein audio information from the first party is transmitted to the second party by the data entry system.

13. The data entry system of claim 10 wherein to receive the information regarding the viewing direction of the first party includes to detect the viewing direction of the first party by optically tracking eye movement of the first party.

14. The data entry system of claim 10 wherein:
the first party is a customer of a food provider;
the menu is displayed at the food provider;
the two or more menu choices are associated with food items offered for sale by the food provider; and
the display is associated with an electronic point of sale terminal of the food provider.

15. The data entry system of claim 14 wherein the menu is displayed at a drive-thru order location of the food provider and the supplemental information includes audio information captured from the first party using a microphone located at the drive-thru order location.

16. A data entry system comprising:
an electronic display device;
a viewing direction determination system for optically determining viewing direction information indicating a viewing direction of a first party that is viewing a menu of information;
a memory including non-transitory computer processor executable instructions; and
a computer processor configured to retrieve the instructions from the memory and execute the instructions to:
receive the viewing direction information from the viewing direction determination system;
identify an area of the menu associated with the received viewing direction information, wherein the area of the menu is a subset of the menu;
identify two or more menu choices from among a plurality of menu items that make up the menu of information, wherein the two or more menu choices are identified based on the two or more menu choices being included in the identified area of the menu;
present, on the electronic display device, the identified two or more menu choices of the identified area of the menu prior to receiving information from the first party other than the viewing direction information; and
receive audio information from the first party for identifying a selected menu item from among the two or more displayed menu choices.

17. The data entry system of claim 16 wherein the computer processor performs speech recognition processing on the audio information received by the computer processor from the first party to identify the selected menu item from among the displayed two or more menu choices.

18. The data entry system of claim 16 wherein the audio information is transmitted to a second party operating the data entry system and wherein the computer processor further executes the instructions to receive an input from the second party indicating the selected menu item from among the displayed two or more menu choices.

19. The data entry system of claim 18 wherein:
the first party is a customer of a food provider;
the menu is displayed at the food provider;
the two or more displayed menu choices are associated with food items offered for sale by the food provider;
the electronic display device is associated with an electronic point of sale terminal used by the second party; and
the audio information is captured from the first party using a microphone located in proximity to the menu.

20. The data entry system of claim 19 wherein the viewing direction determination system is integrated into the menu.

21. The data entry system of claim 16 wherein the computer processor further executes the instructions to:
receive second viewing direction information from the viewing direction determination system;
identify a second area of the menu based on the second viewing direction information, wherein the second area of the menu is a subset of the menu; and
present, on the electronic display device, alternative menu choices associated with the identified second area of the menu.

* * * * *